Aug. 28, 1923.
H. E. STURCKE
1,465,954
PROCESS OF PRODUCING CARBON DIOXIDE
Filed July 29, 1919
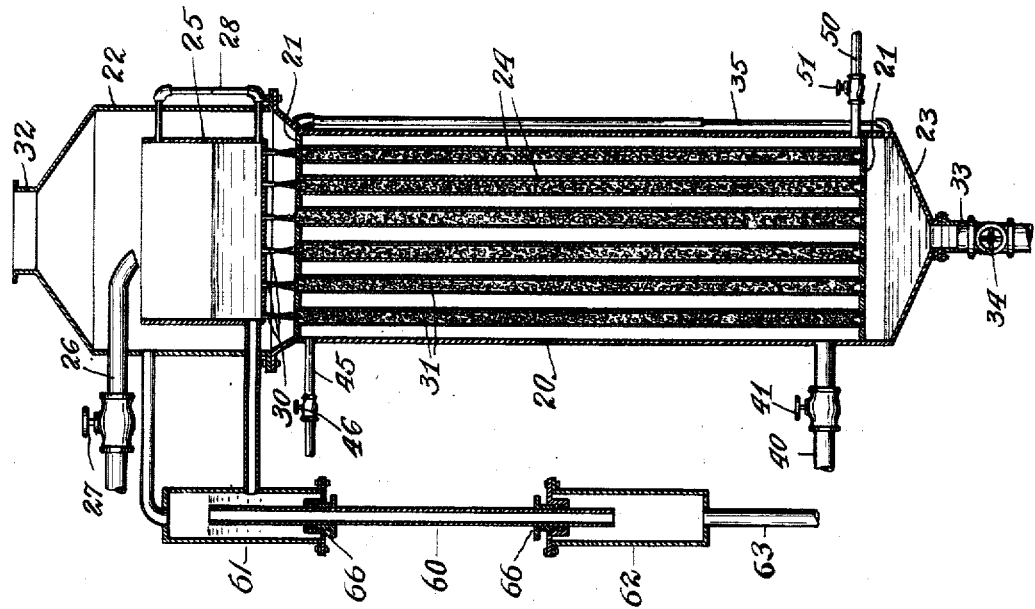
Witnesses
INVENTOR
ATTORNEY Patented Aug. 28, 1923.

1,465,954

UNITED STATES PATENT OFFICE.

HERMAN E. STURCKE, OF BROOKLYN, NEW YORK, ASSIGNOR TO GENERAL CARBONIC COMPANY, OF NEW YORK, N. Y., A CORPORATION OF NEW YORK.

PROCESS OF PRODUCING CARBON DIOXIDE.

Application filed July 29, 1919. Serial No. 314,051.

*To all whom it may concern:*

Be it known that I, HERMAN E. STURCKE, a citizen of the United States, residing at Brooklyn, New York city, in the county of Kings and State of New York, have invented certain new and useful Improvements in Processes of Producing Carbon Dioxide, fully described and represented in the following specification and the accompanying drawings, forming a part of the same.

The invention relates to processes for producing carbon dioxide, and more particularly the invention relates to the process of separating carbon dioxide by means of heat from a solution in which it has been absorbed from a mixture of gases.

In accordance with the invention, the solution is heated in such a way that practically only fresh solution is exposed to heat and that the available heat is utilized very effectively, and vapors and gases driven by the heat from the solution are brought into contact with fresh solution in an advantageous way. Thereby a much larger percentage of the carbon dioxide is driven off from the solution in a given time than has been possible in previous methods.

In the commercial production of carbon dioxide, gases rich in carbon dioxide are first produced by the combustion of carbonaceous fuel or in other ways, and the carbon dioxide is then extracted from such mixed gases by bringing the gases into contact with a solution of alkali-metal mono-carbonate, the carbon dioxide reacting with the mono-carbonate to form bi-carbonate. The solution containing the absorbed carbon dioxide is then heated to drive off the carbon dioxide in gaseous form. In this operation the percentage of the gas driven off from a body of solution in successive equal time units decreases at a rapid ratio; also the percentage of gas driven off in a certain time with other conditions equal varies in greater than direct ratio to the percentage of bi-carbonate in the solution compared to the mono-carbonate therein.

Attempts have also been made to improve the process of separating carbon dioxide from the solution in which it has been absorbed by different methods of circulating the solution, by adding fresh solution to solution from which part of the carbon dioxide has been extracted, and by other expedients, but these have failed to increase the percentage of carbon dioxide extracted from solution to a desirably large extent, and the improvement by such expedients is not comparable in degree to that realized from my invention.

In the treatment of mixed gases with a solution of alkali-metal mono-carbonate, either mono-carbonate of sodium or potassium, the carbonic dioxide is extracted or fixed in the solution by a chemical reaction between the mono-carbonate of the solution and the carbon dioxide, by which a certain part of the mono-carbonate is converted into alkali-metal bi-carbonate and retained in the solution in the form of a definite chemical compound. The mention herein of extraction of carbon dioxide from the "solution," therefore, is not intended to imply that in the extraction of the gas from the gaseous mixture, the gas goes into direct solution in the liquid. The carbon dioxide contained in the solution may be described as "semi-bound" carbon dioxide; that is, it is the amount of carbon dioxide in the solution in excess of the amount necessary to form the alkali-metal mono-carbonate, and is, of course, that additional amount of carbon dioxide which is combined in the form of alkali-metal bi-carbonate. The semi-bound carbon dioxide may be driven off from the solution by suitable heat treatment.

The improvement provided by my invention, broadly described, consists in passing the solution containing semi-bound carbon dioxide through narrow passages or tubes which are externally heated.

The passages or tubes may, desirably, be filled with suitable material for retarding the passage of liquid through the passages and for still further dividing or separating the liquid into thin films or narrow streams, so that it may be more effectively and quickly heated and the semi-bound carbon dioxide more quickly driven out. Suitable material for this purpose is loosely arranged small plates, disks or turnings of steel, or other material which retards the flow of the solution, separates it into fine films and is at the same time a good conductor of heat and not subject to chemical attack by the solution. As the solution passes through the tubes it progressively absorbs heat and the portion of the solution near the bottom of the tubes gives off gas and vapor most rapidly. This heated gas rising through the tubes encounters the relatively cooler solution coming in at the top and imparts the heat of the gas to the solution, and at the same time this interchange of heat prevents foaming and carrying out from the tubes solution from which the gas has not been properly extracted. The method of heating and moving the solution through the tubes provides a certain counter-current relation of the solution to the available heat. The gas liberated at the upper ends of the tubes is drawn off and secured in well-known ways, and the solution, from which most of the carbon dioxide gas has been extracted, is collected and drawn off at the lower ends of the tubes. The solution, which has now been largely converted into the form of a mono-carbonate solution, may then be conveyed back to the point of application to mixed gases for absorbing carbon dioxide therefrom.

By my method, I am able to extract from a solution containing approximately 80% of alkali-metal bicarbonate, approximately 85% of the semi-bound carbon dioxide therein, with apparatus of reasonable size and with reasonable expense for heat. In the best previous processes known to me, only 50% of the semi-bound carbon dioxide present in the form of alkali-metal bicarbonate has been extracted.

The accompanying drawing shows in section one form of apparatus suitable for use in practicing the invention.

The apparatus comprises a steam cylinder 20 with upper and lower heads 21. A dome 22 forms an upper continuation of the cylinder. At the bottom the cylinder is continued to provide a sump 23 to receive boiled out solution. The sump and the dome are connected by a plurality of solution tubes 24 suitably inserted in the headers. The dome contains a tank 25 for fresh solution which is introduced into it through a pipe 26, controlled by a valve 27, up to a level indicated by a gage 28. At the bottom the solution tank is provided with a plurality of nozzles 30, each discharging into one of the pipes 24. The pipes are preferably filled with finely divided material, such as steel chips or shavings 31. At the top the dome has a connection 32 through which extracted carbon dioxide may pass to any suitable storing or compressing apparatus. The bottom sump 23 has a pipe 33 controlled by a valve 34 through which boiled out solution may be drawn off. A gage 35 connected to the sump and to the lower part of the dome, respectively, indicates the level of liquid in the sump and tubes, if any liquid is retained therein. Steam is admitted to the cylinder through pipe 40 controlled by valve 41. A pipe 50 controlled by valve 51 provides for drawing off water of condensation. Pipe 45 connected at the top of the steam cylinder and controlled by valve 46 provides for drawing off air from the cylinder as steam is admitted, when necessary.

One convenient arrangement for maintaining a proper level of solution in tank 25, and for adjusting this level, consists, as shown in the drawing, in an adjustable overflow pipe 60. The upper end of pipe 60 is contained in a larger pipe 61 and the lower end is contained in a large pipe 62, from the bottom of which a pipe 63 leads to the main solution container. The upper end of large pipe 61 is connected to dome 22 by a pipe 64, and an intermediate part of pipe 61 is connected to tank 25, near its bottom, by a pipe 65. The overflow pipe 60 has an adjustable and water-tight connection with large pipes 61 and 62 by means of suitable stuffing boxes 66. By moving pipe 60 up and down the level of solution in tank 25 will be maintained adjustably at the same level as the upper end of pipe 60. By maintaining the proper head of liquid in the tank, the rate of flow through nozzles 30 may be controlled in accordance with the nature of the solution, degree of heat, and other conditions, to give the proper heating effect in the time the solution requires to pass through the tubes.

The cylinder being filled with steam, fresh solution is introduced into tank 25 through pipe 26 up to the proper level, and then runs through nozzles 30 into heating tubes 24, in each of which the solution passes down through the finely divided heat conducting filling and is thoroughly exposed in finely divided condition to heat passing through the pipe walls. As the solution descends through the tubes, it becomes progressively hotter and gas is driven off most freely near the bottom of the tubes. This gas rises through the tubes and near the tops encounters the fresh solution coming from nozzles 30. The solution in tank 25 is preheated to a certain extent, but is relatively cooler than the hot gases in the tubes. The solution entering the tubes, therefore, takes up heat from the heated gas and at the same time cools the gases and prevents foaming over from the tubes into the dome. The result of the heat interchange described is a countercurrent effect, inasmuch as the greatest amount of available heat is applied to the solution as it is nearest the bottoms of the tubes, where the solution is relatively weak in gas, so that all the remaining gas which can practicably be extracted is driven off, while the relatively rich solution near the tops of the tubes receives a less degree of heat, but sufficient to drive off a considerable part of the gas in the upper portions of the tubes. The exposure of the solution in the tubes for a very few minutes suffices to drive off a very large percentage—all that can practicably be extracted—of the semi-bound carbon dioxide.

The carbon dioxid extracted arises through the pipes and through the dome 22 and passes out through the connection 32. By a suitable regulation of the flow of the liquid, the sump 23 may be kept practically empty. The valves and the gage 35 provide for retaining a certain amount of boiled out solution in the sump and lower ends of the pipes, to insure proper supply of solution to the intake of a pump (not shown) for conveying the solution back for re-employment in the first part of the process.

Evidently, in the performance of the method in connection with this apparatus, practically only fresh solution is exposed to heat, or at any rate any given part of the solution is in contact with the heating medium for only a very few minutes. The most efficient extraction is thereby obtained in accordance with the principles previously detailed, and difficulties encountered when a certain amount of solution is boiled a long time or when fresh solution is mixed with partly boiled out solution are avoided.

My boiling process is so efficient that heat may be supplied by exhaust steam from engines at a pressure of only from 3 to 5 pounds. The slight back pressure occasioned by this utilization of the exhaust does not detract to any noticeable extent from the efficiency of the engine. In old methods it was found necessary to use steam at a pressure of from 15 to 25 pounds, and frequently it was necessary to use live steam in connection with available exhaust steam to provide sufficient heat.

What is claimed is:

1. The method of producing carbon dioxide, comprising passing a solution containing alkali-metal bi-carbonate downwardly through narrow closed conduits and exposing the exterior of said conduits to a heating medium, drawing off the liberated carbon dioxide gas at the upper end of the conduits, and drawing off solution from which a large percentage of the carbon dioxide has been extracted at the lower end of the conduits.

2. The method of producing carbon-dioxide, comprising passing a solution containing alkali-metal bi-carbonate downwardly through narrow closed conduits provided with means for retarding and dividing the liquid, subjecting the liquid in its downward passage through the conduits to heat supplied from a heating medium applied to the exterior of the conduits and the liquid in the upper part of the conduits to the hot gases and vapors rising from the lower portions thereof, drawing off the liberated gas at the upper end of the conduits, and drawing off boiled-out solution from the lower end of the conduits.

3. The method of producing carbon dioxide, comprising passing a solution containing alkali-metal bi-carbonate downwardly through a small tube containing a flow retarding and distributing filling of heat conducting material, supplying heat to the exterior of the tube by means of steam under pressure, collecting liberated gas at the upper end of the tube, and collecting the boiled-out solution at the lower end of the tube.

In testimony whereof I have hereunto set my hand in the presence of two subscribing witnesses.

HERMAN E. STURCKE.

Witnesses:
ETHEL JOHNES,
D. W. SMITH.